(12) United States Patent
Cha

(10) Patent No.: US 10,857,932 B2
(45) Date of Patent: Dec. 8, 2020

(54) LAMP FOR VEHICLE

(71) Applicant: ZKW Group GmbH, Wieselburg (AT)

(72) Inventor: Joongtaek Cha, Seoul (KR)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 16/566,492

(22) Filed: Sep. 10, 2019

(65) Prior Publication Data

US 2020/0101887 A1     Apr. 2, 2020

(30) Foreign Application Priority Data

Sep. 28, 2018   (KR) ........................ 10-2018-0116218

(51) Int. Cl.
| | |
|---|---|
| *B60Q 1/04* | (2006.01) |
| *B60Q 1/00* | (2006.01) |
| *B60Q 1/20* | (2006.01) |
| *B60Q 1/30* | (2006.01) |
| *B60Q 1/34* | (2006.01) |
| *H01Q 1/32* | (2006.01) |
| *H01Q 9/04* | (2006.01) |
| *H01Q 13/02* | (2006.01) |
| *H01Q 21/08* | (2006.01) |

(52) U.S. Cl.
CPC ............ *B60Q 1/0023* (2013.01); *B60Q 1/04* (2013.01); *B60Q 1/20* (2013.01); *B60Q 1/30* (2013.01); *B60Q 1/34* (2013.01); *H01Q 1/3233* (2013.01); *H01Q 1/3291* (2013.01); *H01Q 9/0407* (2013.01); *H01Q 13/02* (2013.01); *H01Q 21/08* (2013.01)

(58) Field of Classification Search
CPC .......... B60Q 1/0023; B60Q 1/34; B60Q 1/30; B60Q 1/20; B60Q 1/04; H01Q 13/02; H01Q 9/0407; H01Q 1/3291; H01Q 1/3233; H01Q 1/42; H01Q 21/28; H01Q 1/44; H01Q 21/064
See application file for complete search history.

(56) References Cited

U.S. PATENT DOCUMENTS

| | | | | |
|---|---|---|---|---|
| 5,963,172 A | * | 10/1999 | Pfizenmaier | ........... G01S 13/931 343/721 |
| 6,031,504 A | * | 2/2000 | McEwan | ................. H01Q 1/525 343/772 |
| 2004/0085249 A1 | * | 5/2004 | Kitamori | ................ H01Q 25/00 343/776 |
| 2004/0108963 A1 | * | 6/2004 | Clymer | ................ H01Q 15/242 343/837 |
| 2010/0188304 A1 | * | 7/2010 | Clymer | .............. H01Q 13/0258 343/753 |

FOREIGN PATENT DOCUMENTS

| | | |
|---|---|---|
| JP | 2009-225133 | 10/2009 |
| JP | 2015-089109 | 5/2015 |
| JP | 2010-137758 | 6/2019 |
| KR | 20-1989-0009079 | 12/1989 |

* cited by examiner

*Primary Examiner* — Donald L Raleigh
(74) *Attorney, Agent, or Firm* — Fish & Richardson P.C.

(57) ABSTRACT

Disclosed is a lamp for a vehicle, including: at least one light source; an outer lens for covering the at least one light source; a housing coupled to the outer lens to form a space; and an antenna module disposed in the space and comprising at least one horn antenna for transmitting and receiving electromagnetic waves.

15 Claims, 20 Drawing Sheets

231 232 233 234 235 236 237

LAMP FOR VEHICLE

CROSS-REFERENCE TO RELATED APPLICATION

This application claims the priority benefit of Korean Patent Application No. 10-2018-0116218, filed on Sep. 27, 2018, the disclosure of which is incorporated herein by reference.

BACKGROUND OF THE INVENTION

1. Field of the Invention

The present invention relates to a lamp for a vehicle.

2. Description of the Related Art

A vehicle is an apparatus that moves in a direction desired by a user riding therein. A representative example of vehicle may be an automobile.

A vehicle includes a variety of lamps. For example, the vehicle includes a head lamp and a rear combination lamp. The vehicle includes a variety of sensors to detect an object placed outside the vehicle. It is desired that such sensors are disposed in the vehicle in order to protect the sensors from foreign substances. In addition, it is desirable that the sensors are disposed in order to detect an object placed outside the vehicle. It is necessary to study and research a sensor that is able to meet the sensor protective purpose and the object detection purpose.

SUMMARY OF THE INVENTION

To achieve the above problem, an object of the present invention is to provide a lamp for a vehicle, which is integrally formed with a sensor so as to prevent contamination of the sensor due to a foreign substance.

It is another object of the present invention to provide a vehicle including the lamp.

Objects of the present invention should not be limited to the aforementioned objects and other unmentioned objects will be clearly understood by those skilled in the art from the following description.

To achieve the above objects, a lamp for a vehicle according to an embodiment of the present invention includes an antenna module including a horn antenna.

The details of other embodiments are included in the following description and the accompanying drawings.

According to the present invention, there are one or more effects as follows.

First, as an antenna of a radar is disposed inside an outer lens, contamination of the antenna may be prevented.

Second, as an inner space of a lamp is utilized up to the most by the use of a horn antenna, a lamp for a vehicle including an antenna may be implemented without modification of a lamp design.

Third, as antenna module is disposed in a non-optic region, interference of light may be minimized.

Fourth, as antenna module is disposed to correspond to a high-curvature region of an outer lens, degradation of a radar recognition rate may be minimized.

Effects of the present invention should not be limited to the aforementioned effects and other unmentioned effects will be clearly understood by those skilled in the art from the claims.

BRIEF DESCRIPTION OF THE DRAWINGS

The embodiments will be described in detail with reference to the following drawings in which like reference numerals refer to like elements wherein.

DETAILED DESCRIPTION OF THE EMBODIMENTS

Figure 1:
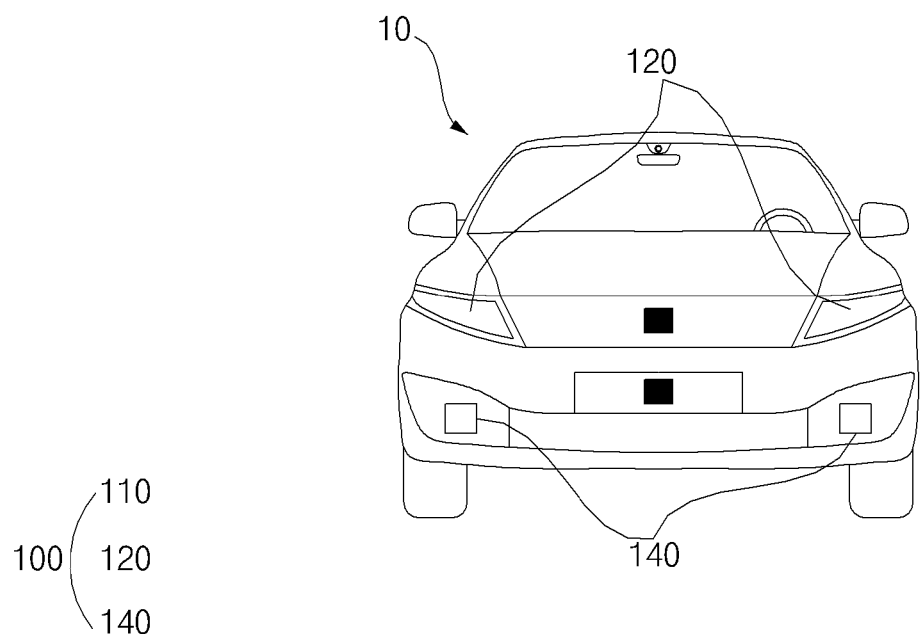
FIG. 1 is a diagram illustrating an exterior appearance of a vehicle according to an embodiment of the present invention.
Figure 1:
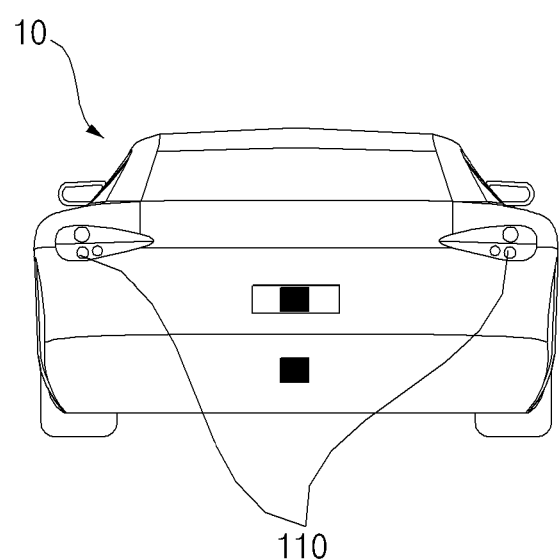

Hereinafter, the embodiments disclosed in the present specification will be described in detail with reference to the accompanying drawings, and the same or similar elements are denoted by the same reference numerals even though they are depicted in different drawings and redundant descriptions thereof will be omitted. In the following description, with respect to constituent elements used in the following description, the suffixes "module" and "unit" are used or combined with each other only in consideration of ease in the preparation of the specification, and do not have or serve as different meanings. Accordingly, the suffixes "module" and "unit" may be interchanged with each other. In addition, in the following description of the embodiments disclosed in the present specification, a detailed description of known functions and configurations incorporated herein will be omitted when it may make the subject matter of the embodiments disclosed in the present specification rather unclear. In addition, the accompanying drawings are provided only for a better understanding of the embodiments disclosed in the present specification and are not intended to limit the technical ideas disclosed in the present specification. Therefore, it should be understood that the accompanying drawings include all modifications, equivalents and substitutions included in the scope and spirit of the present invention.

It will be understood that although the terms "first," "second," etc., may be used herein to describe various components, these components should not be limited by these terms. These terms are only used to distinguish one component from another component.

It will be understood that when a component is referred to as being "connected to" or "coupled to" another component, it may be directly connected to or coupled to another component or intervening components may be present. In contrast, when a component is referred to as being "directly connected to" or "directly coupled to" another component, there are no intervening components present.

As used herein, the singular form is intended to include the plural forms as well, unless the context clearly indicates otherwise.

In the present application, it will be further understood that the terms "comprises", includes," etc. specify the presence of stated features, integers, steps, operations, elements, components, or combinations thereof, but do not preclude the presence or addition of one or more other features, integers, steps, operations, elements, components, or combinations thereof.

A vehicle as described in this specification may include an automobile and a motorcycle. Hereinafter, a description will be given based on an automobile.

A vehicle as described in this specification may include all of an internal combustion engine vehicle including an engine as a power source, a hybrid vehicle including both an engine and an electric motor as a power source, and an electric vehicle including an electric motor as a power source.

In the following description, "the left side of the vehicle" refers to the left side in the forward driving direction of the vehicle, and "the right side of the vehicle" refers to the right side in the forward driving direction of the vehicle.

FIG. 1 is a diagram illustrating an exterior appearance of a vehicle according to an embodiment of the present invention.

Figure 2:
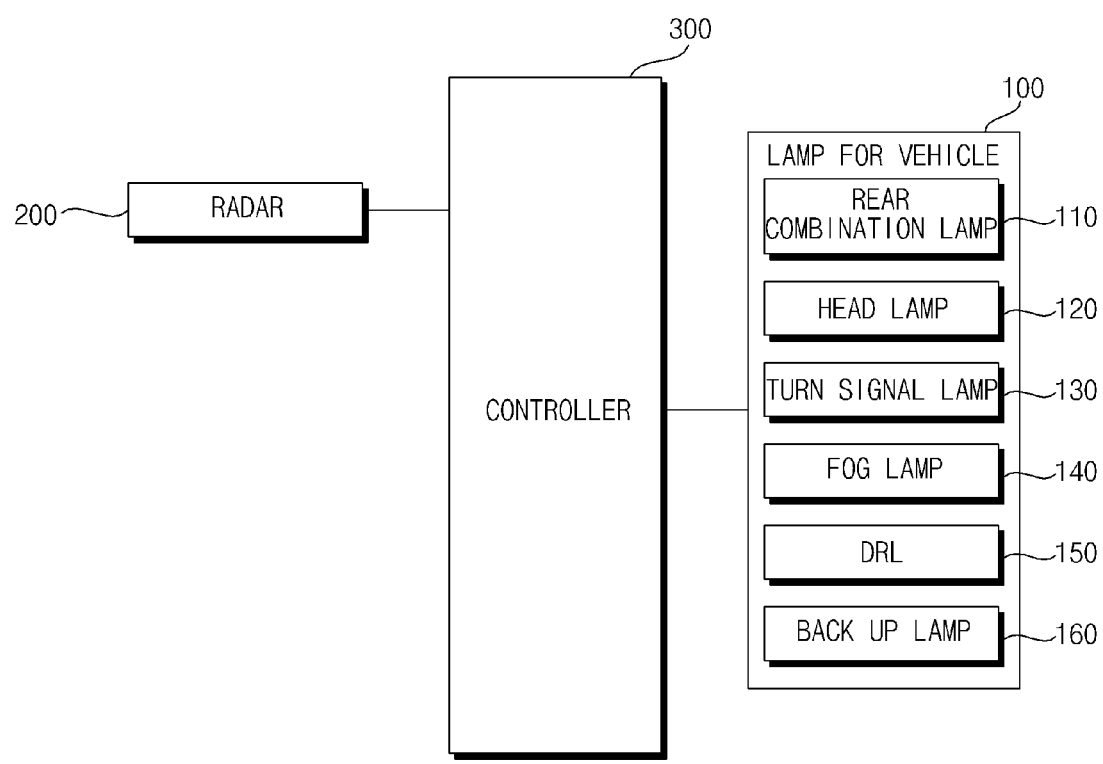
FIG. 2 is an exemplary control block diagram of a vehicle according to an embodiment of the present invention.

FIG. 2 is an exemplary control block diagram of a vehicle according to an embodiment of the present invention.

Referring to FIGS. 1 and 2, a vehicle 10 according to an embodiment of the present invention is defined as a transporting means that runs on a road or a rail. The vehicle 10 includes an automobile, a train, and a motorbike. The vehicle 10 may be one of an autonomous vehicle and a manually-driven vehicle.

The vehicle 10 may include: a power train drive unit for controlling a power train; a chassis drive unit for controlling a chassis; a door drive unit for controlling a door; a safety equipment drive unit for controlling a variety of safety equipment; a lamp drive unit for controlling a variety of lamps; and an air-conditioner drive unit for controlling an air-conditioner. A variety of drive units included in the vehicle 10 may be described as electronic devices. In some embodiments, the vehicle 10 may further include another component in addition to components described in this specification or may not include some of components described herein.

The vehicle 10 may include at least one object detection device for detecting an object located outside the vehicle 10. The object detection device may include a radar 200. The object detection device may further include at least one of a camera, lidar, an ultrasonic sensor, or an infrared sensor. The object detection device may provide data on an object, which is generated based on a sensing signal generated by a sensor, to at least one electronic device included in the vehicle 10. At least one object detection device included in the vehicle 10 may be an electronic device.

The vehicle 10 may include at least one communication device for exchanging signals with a device located outside the vehicle 10. The communication device may exchange signals with at least one of infrastructure (e.g., a server) or another vehicle. At least one communication device included in the vehicle 10 may be an electronic device.

The vehicle 10 may include an internal communication system. A plurality of electronic devices included in the vehicle 10 may exchange signals through a medium which is the internal communication system. The signals may include data. The internal communication system may use at least one communication protocol (e.g., a CAN, a LIN, FlexRay, MOST, Ethernet). A controller 300 may exchange signals with a lamp 100 for a vehicle and with the radar 200 through the internal communication system.

The vehicle 10 may include the radar 200, the lamp 100, and the controller 300.

The radar 200 may include an electromagnetic wave transmitter and an electromagnetic wave receiver. According to a wave generating principle. The radar 200 may be implemented as a pulse radar or a continuous wave radar. According to a signal waveform, the radar 200 may be implemented as a Frequency Modulated Continuous Wave (FMCW) radar or a Frequency Shirt Keyong (FSK) radar among types of the continuous wave radar. The radar 200 may detect an object through a medium of electromagnetic waves based on a Time of Flight (TOF) method or a phase-shift method, and may detect a location of the detected object, a distance to the detected object, and a speed relative to the detected object.

The radar 200 may include an antenna module 210 (see FIG. 4A) for transmitting and receiving electromagnetic waves, a Monolithic Microwave Integrated Circuit (MMIC), and a Printed Circuit Board (PCB) 260 (see FIG. 4A) on which a processor of a radar device is mounted.

The antenna module 210 may be disposed inside the lamp 100. For example, the antenna module 210 may be disposed inside at least one of a rear combination lamp 110, a head lamp 120, a turn signal lamp 130, a fog lamp 140, a Daytime Running Lights (DRL) 150, or a back up lamp 160.

The PCB 260 may be disposed inside the lamp 100. For example, the PCB 260 may be at least one of the rear combination lamp 110, the head lamp 120, the turn signal lamp 130, the fog lamp 140, the DRL 150, or the back up lamp 160.

The lamp 100 may be driven based on an electrical signal provided from the lamp drive unit. The lamp 100 may include the rear combination lamp 110, the head lamp 120, the turn signal lamp 130, the fog lamp 140, the DRL 150, and the back up lamp 160.

The lamp 100 may include: at least one light source; an outer lens which covers the light source; and a housing which is coupled to the outer lens to form a space. For example, each of the rear combination lamp 110, the head lamp 120, the turn signal lamp 130, the fog lamp 140, the DRL 150, and the back up lamp 160 may include: at least one light source; an outer lens which covers the light source; a housing which is coupled to the outer lens to form a space; and a bezel. The antenna module 210 and the PCB 260 may be disposed in the space that is formed as the outer lens and the housing are coupled to each other.

The controller 300 may be electrically connected to the radar 200 and the lamp 100 to exchange signals with the radar 200 and the lamp 100. The controller 300 may be implemented using at least one of the following: application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and an electrical unit for performing other functions.

The controller 300 may control overall operation of each unit in the vehicle 10. The controller 300 may be referred to as an Electronic Control Unit (ECU).

Figure 3:
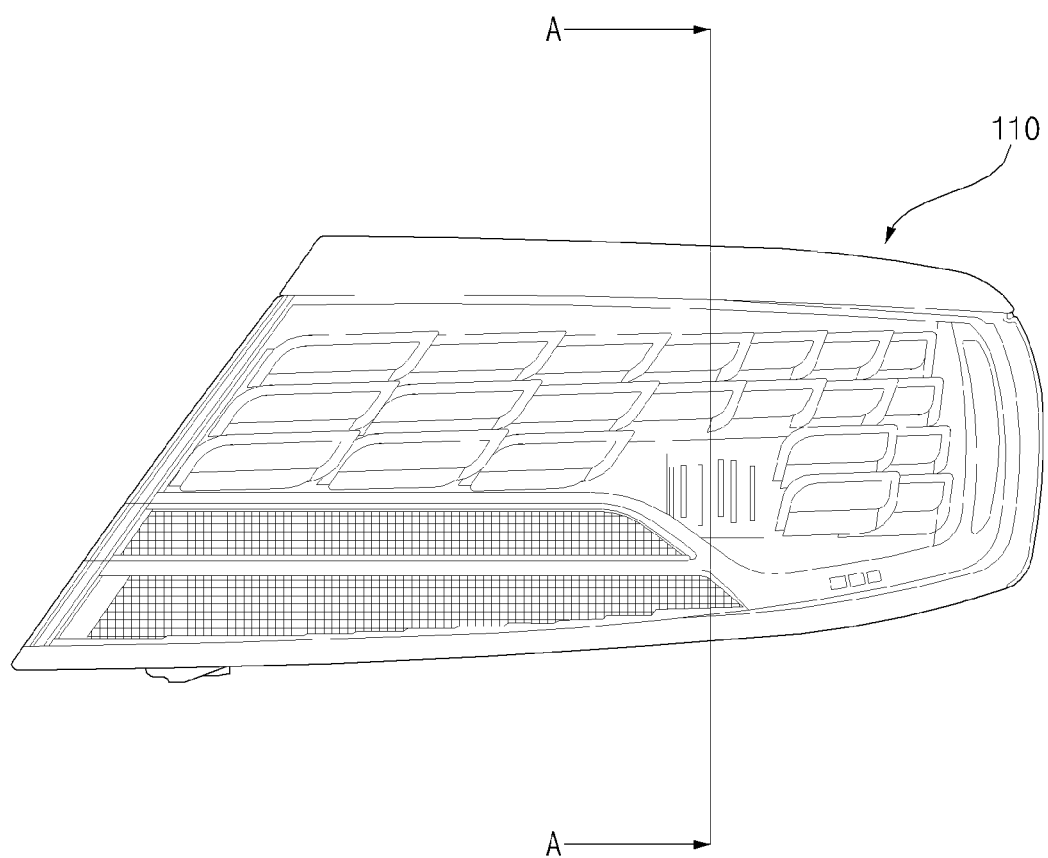
FIG. 3 is a diagram illustrating an exterior appearance of a rear combination lamp according to an embodiment of the present invention.

FIG. 3 is a diagram illustrating an exterior appearance of a rear combination lamp according to an embodiment of the present invention.

Figure 4A:
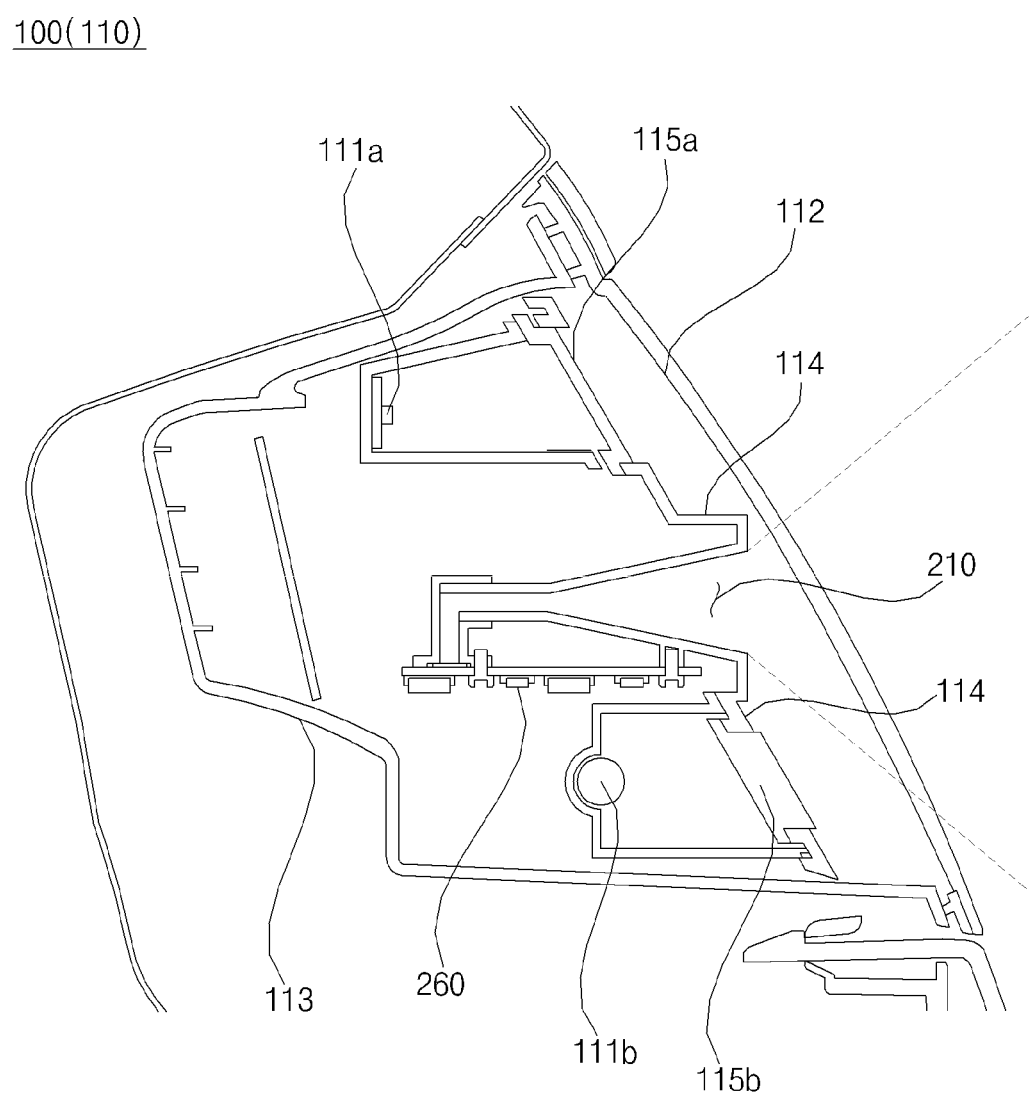
FIGS. 4A and 4B are cross-sectional views taken along line A-A in FIG. 3.

FIG. 4A is a cross-sectional view taken along line A-A in FIG. 3.

Figure 4B:
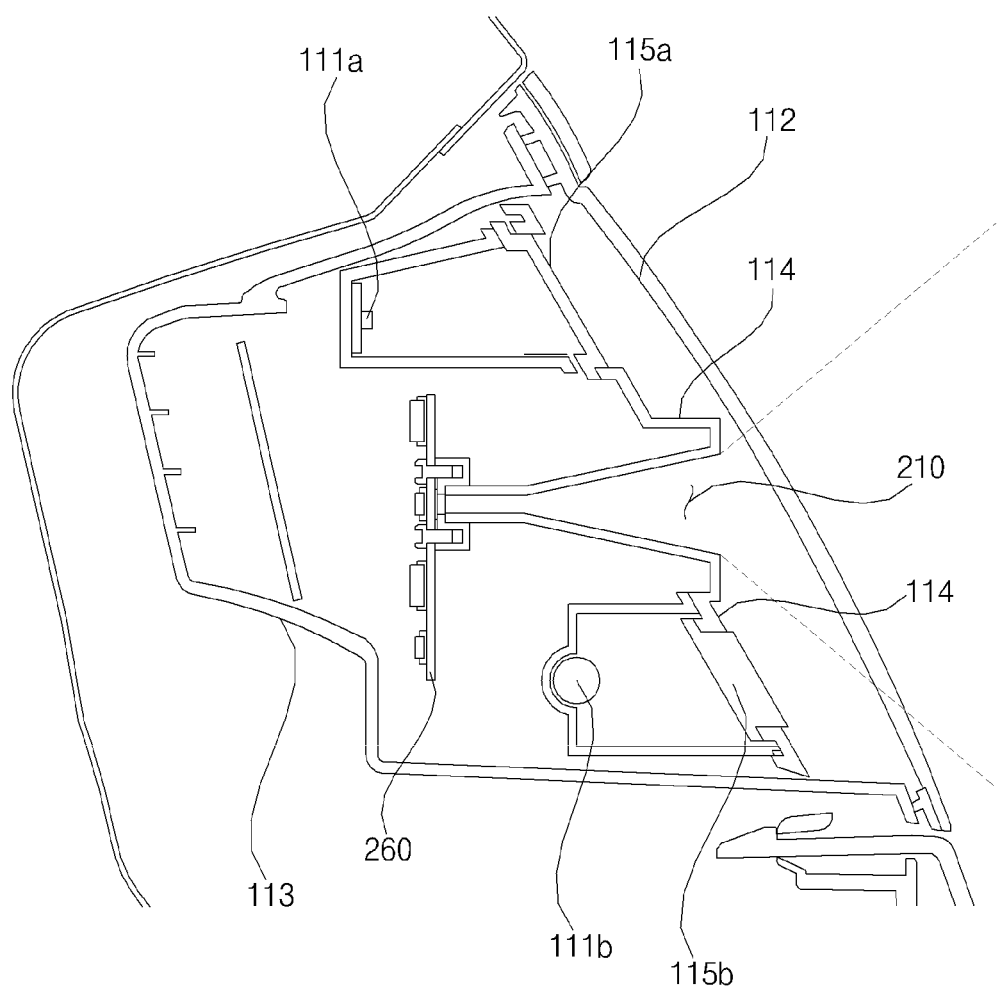

FIG. 4B is a cross-sectional view taken along line A-A in FIG. 3.

Referring to FIGS. 3 to 4B, the lamp 100 is exemplified as the rear combination lamp 110. The rear combination lamp 110 may include a tail lamp and a brake lamp. In some embodiments, at least one of the turn signal lamp 130, the DRL 150, or the back up lamp 160 may be classified as a sub-component of the rear combination lamp 110.

The lamp 100 may include at least one light source 111a and 111b, an outer lens 112, a housing 113, the antenna module 210, and the PCB 260. In some embodiments, the lamp 100 may further include an inner lens 115a and 115b for changing an optical path of light output from the light source 111a and 111b, and a bezel 114.

The light source 111a and 111b may include a device capable of converting electrical energy into light energy. For example, the light source 111a and 111b may include at least one of a Light Emitting Diode (LED), a micro LED, or a Laser Diode (LD). In some embodiments, the light source 111a and 111b may include halogen, HID, and OLED.

The outer lens 112 may protect the inside of the lamp 100. The outer lens 112 may be formed of a transparent lamp. Together with the housing 113, the lens 112 may separate an internal space and an external space of the lamp 100.

The outer lens 112 may cover a variety of components of the lamp 100. For example, the outer cover may cover the light source 111a and 111b, the bezel 114, the inner lens 115a and 115b, the antenna module 210, and the PCB 260.

The housing 113 may define the exterior appearance of the lamp 100. For example, the housing 113 may be coupled to the outer lens 112 to form the exterior appearance of the lamp 100.

The housing 113 may separate an internal space and an external space of the lamp 100. For example, together with the outer lens 112, the housing 113 may separate an internal space and an external space of the lamp 100. The housing 113 may form a space therein. For example, the housing 113 may be coupled to the outer lens 112 to form a space.

The antenna module 210 may be in an internal space defined by the housing 113 and the outer lens 112. The antenna module 210 may include at least one antenna for transmitting and receiving electromagnetic waves. For example, the antenna module 210 may include at least one horn antenna for transmitting and receiving electromagnetic waves.

The antenna module 210 may be horizontally disposed in an internal space defined by the housing 113 and the outer lens 112, as illustrated in FIG. 4A. For example, the antenna module 210 is disposed such that the largest surface among multiple surfaces defining the antenna module 210 in a three-dimensional shape faces the ground. For example, the antenna module 210 is disposed such that the largest surface among multiple surfaces defining the antenna module 210 in a three-dimensional shape faces the sky.

The horn antenna included in the antenna module 210 may be a H-plane sectoral horn array antenna. Alternatively, the horn antenna included in the antenna module 210 may be an E-plane sectoral horn array antenna.

The horn antenna may be disposed in a region to which light generated by at least one light source is not emitted. The horn antenna may be disposed between a plurality of light output units. The horn antenna may be disposed between a first light output unit 111a and 115a and a second light output unit 111b and 115b. Meanwhile, the light output units may be a structure including the light source 111a and 111b and the inner lens 115a and 115b.

The horn antenna may be covered by a relatively high-curvature region of the outer lens 112. For example, the horn antenna may be covered by a region of the outer lens 112, which is relatively flat as compared to other region. For example, the outer lens 112 may include a first region with a curvature equal to or higher than a first reference value, and a second region with a curvature equal to or lower than a second reference value. The horn antenna may be covered by the first region. The light output units may be covered by the second region.

The PCB 260 may be disposed in the internal space defined by the housing 113 and the outer lens 112. The PCB 260 may be electrically connected with an antenna included in the antenna module 210. For example, the PCB 260 may be electrically connected with at least one horn antenna included in the antenna module 210.

The PCB 260 may be horizontally disposed in the internal space defined by the housing 113 and the outer lens 112 as illustrated in FIG. 4A. For example, the PCB 260 may be disposed such that one surface of the PCB 260 faces the ground. The lamp 100 may further include a support structure to support the PCB 260. The support structure may support the PCB 260 such that the PCB 260 is horizontally disposed.

The PCB 260 may include a first surface, and a second surface electrically connected to the first surface. The first surface may be defined as a top surface that faces the sky when the PCB 260 is horizontally disposed. The second surface may be defined as a bottom surface that faces the ground when the PCB 260 is horizontally disposed. The top surface of the PCB 260 may be electrically connected to the horn antenna. The bottom surface of the PCB 260 may be connected to the MMIC that is included in the radar device. The MMIC may include at least one device, at least one circuit, and at least one processor. For example, the MMIC may include a transmitter and a receiver. The transmitter may include a power amplifier, a code generator, and a waveform generator. The receiver may include a mixer, a filter, and an Analog Digital Converter (ADC).

The bottom surface of the PCB 260 may be electrically connected to an additional processor not included in the MMIC. As such, as both surfaces of the PCB 260 are used, the internal space of the lamp 100 may be utilized more efficiently.

The PCB 260 may be vertically disposed in the internal space defined by the housing 113 and the outer lens 112, as illustrated in FIG. 4B. For example, the PCB 260 may be disposed such that one surface of the PCB 260 faces the outer lens 112. The support structure may support the PCB 260 such that the PCB 260 is vertically disposed.

The bezel 114 may be defined as a finishing member that protects the light output unit while embracing the edges of the light output units. The light output units may be a structure including the light source 111a and 111b and the inner lens 115a and 115b. The bezel 114 may be formed to embrace the edges of the inner lens 115a and 115b. The bezel 114 may distribute light output from the light output units. The bezel 114 may have a role of hiding components of the lamp 100 so that the components cannot be seen from the outside of the lamp 100.

The bezel 114 may be formed of a high-functioning engineering synthetic resin. For example, the bezel 114 may be formed of an alloy of Polybutyleneterephthalate (PBT) with another material.

At least part of the bezel 114 may be surface-treated with a reflective material. For example, at least part of the bezel 114 may be laminated to aluminum.

The lamp 100 may include: at least one light source 111*a* and 111*b*, the outer lens 112 for covering the light source 111*a* and 111*b*; the housing 113 coupled to the outer lens 112 to form a space; the antenna module 210 horizontally disposed in the space and including at least one antenna for transmitting and receiving electromagnetic waves; and the PCB horizontally disposed in the space and electrically connected to an antenna.

Figure 5:
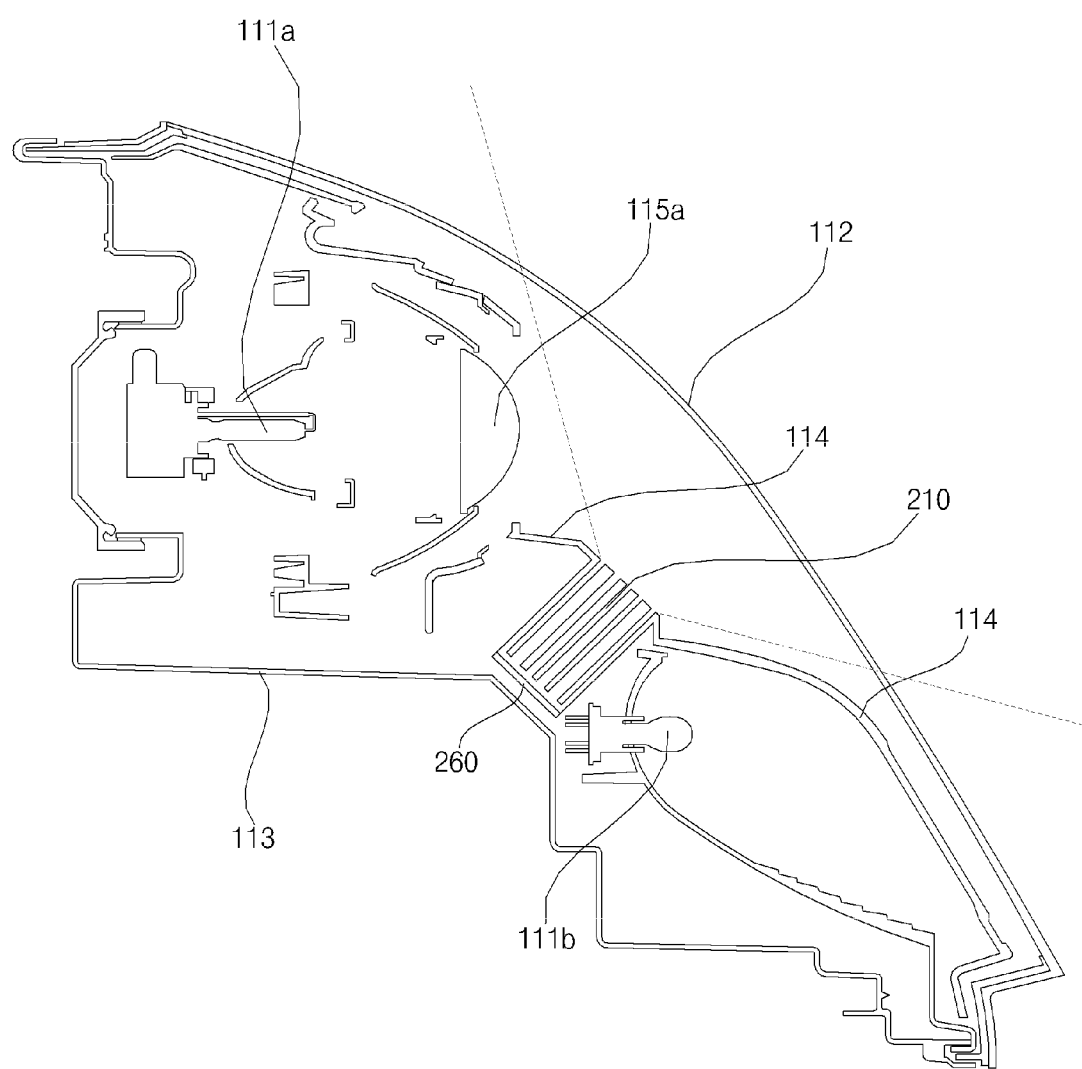
FIG. 5 is a cross-sectional view of a head lamp according to an embodiment of the present invention.

FIG. 5 is a cross-sectional view of a head lamp according to an embodiment of the present invention.

Referring to FIG. 5, the lamp 100 is exemplified by the head lamp 120. The head lamp 120 may include a low beam module and a high beam module. In some embodiments, at least one of the turn signal lamp 130, the DRL 150, and the back up lamp 160 may be classified as a sub-component of the head lamp 120.

The lamp 100 may include at least one light source 111*a* and 111*b*, an outer lens 112, a housing 113, an antenna module 210, and a PCB 260. In some embodiments, the lamp 100 may further include: an inner lens 115*a* for changing an optical path of light output from the light source 111*a* and 111*b*; and a bezel 114.

The description provided with reference to FIGS. 3 to 4B may apply to the light source 111*a* and 111*b*, the outer lens 112, the housing 113, the antenna module 210, the PCB 260, the inner lens 115*a*, and the bezel 114.

In the following, differences from the embodiment of FIGS. 3 to 4B will be mainly described. As illustrated in FIG. 5, the antenna module 210 may be disposed in an internal space defined by the housing 113 and the outer lens 112. For example, the antenna module 210 may be disposed such that the largest surface among multiple surfaces defining the antenna module 210 in a three-dimensional shape faces the ground. For example, the antenna module 210 may be disposed such that the largest surface among multiple surfaces defining the antenna module 210 in a three-dimensional shape forms an acute angle relative to the ground.

As illustrated in FIG. 5, the PCB 260 may be disposed in the internal space defined by the housing 113 and the outer lens 112. For example, the PCB 260 may be disposed such that one surface of the PCB 260 faces the ground. For example, the PCB 260 may be disposed such that one surface of the PCB 260 forms an acute angle relative to the ground. The lamp 100 may further include a support structure capable of supporting the PCB 260. The support structure may support the PCB 260 such that one surface of the PCB 260 faces the ground.

FIGS. 6A to 9 are diagrams illustrating an antenna module according to an embodiment of the present invention.

Figure 6A:
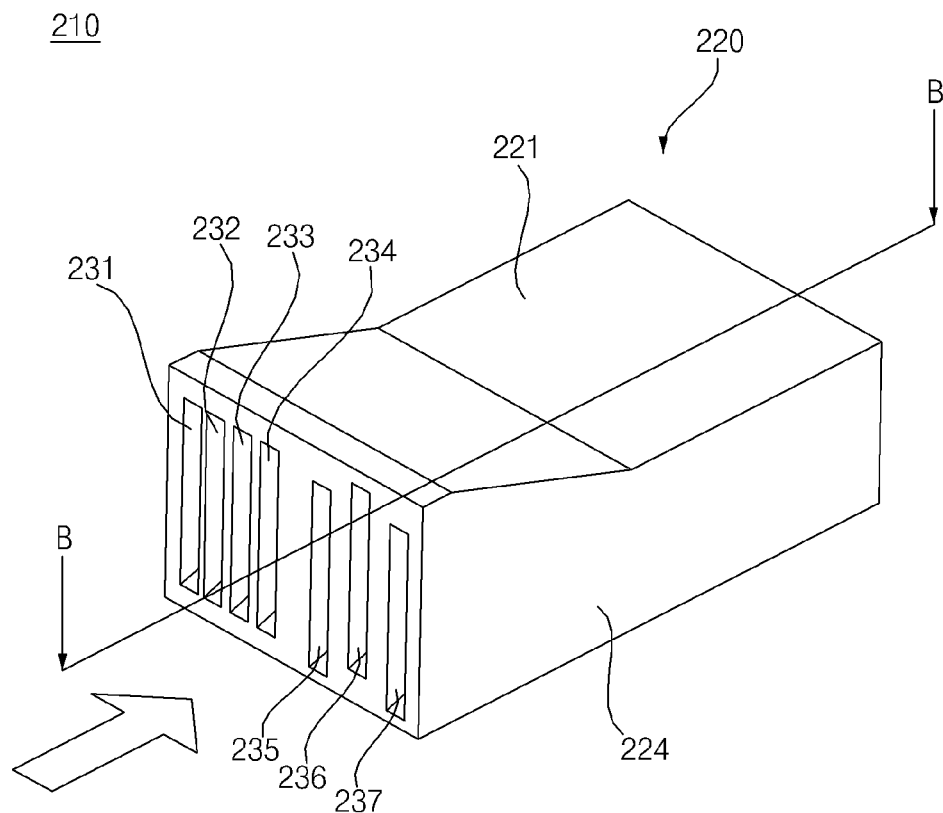
FIGS. 6A to 9 are diagrams illustrating an antenna module according to an embodiment of the present invention.
Figure 6A:
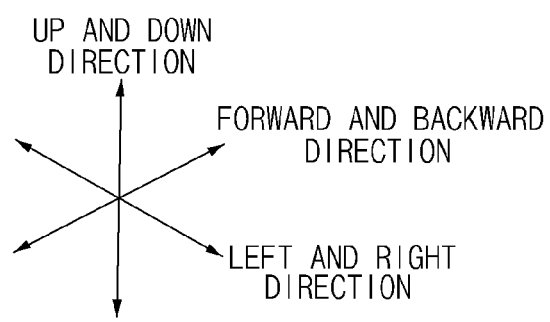
Figure 6B:
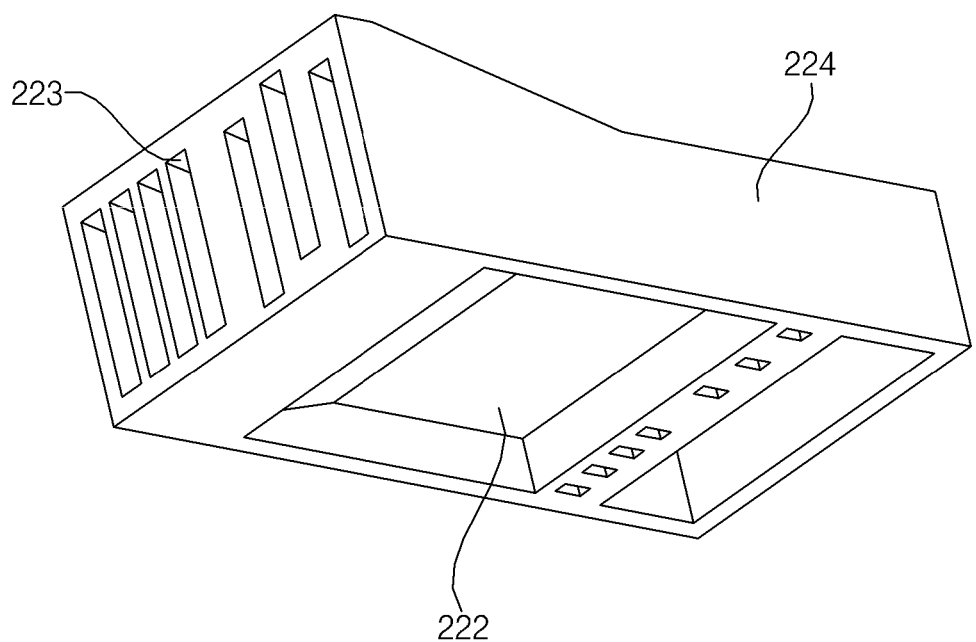
Figure 6B:
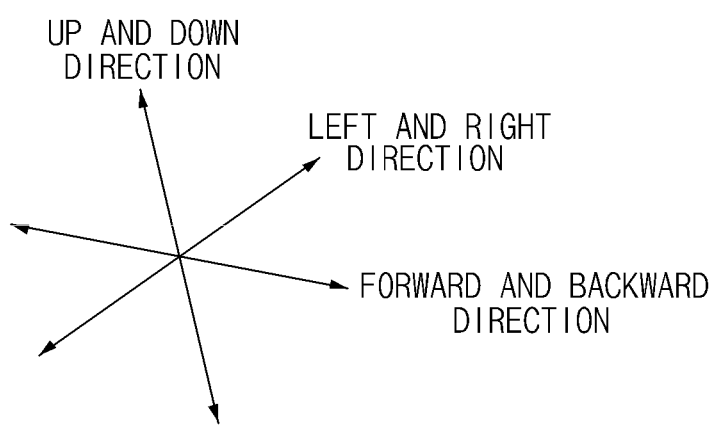

FIGS. 6A and 6B are diagram illustrating an exterior appearance of an antenna module according to an embodiment of the present invention.

Figure 7:
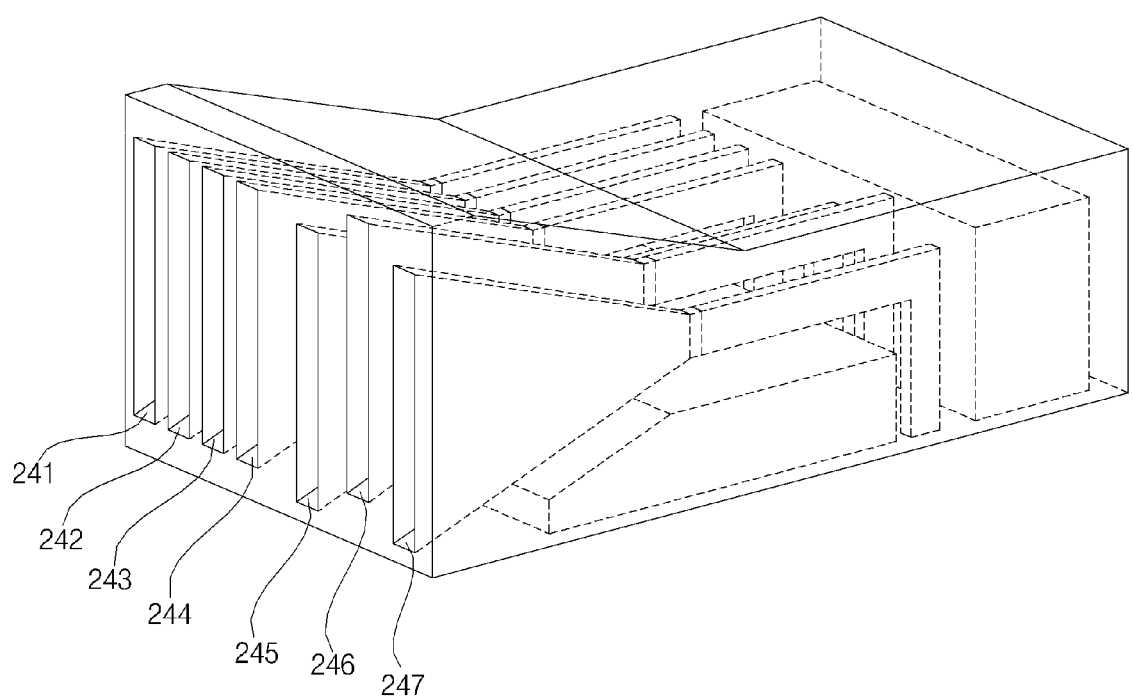

FIG. 7 is a transparent perspective view of an antenna module according to an embodiment of the present invention.

FIG. 8A illustrates an example of an antenna module seen in an arrow direction shown in FIG. 6A.

Figure 9:
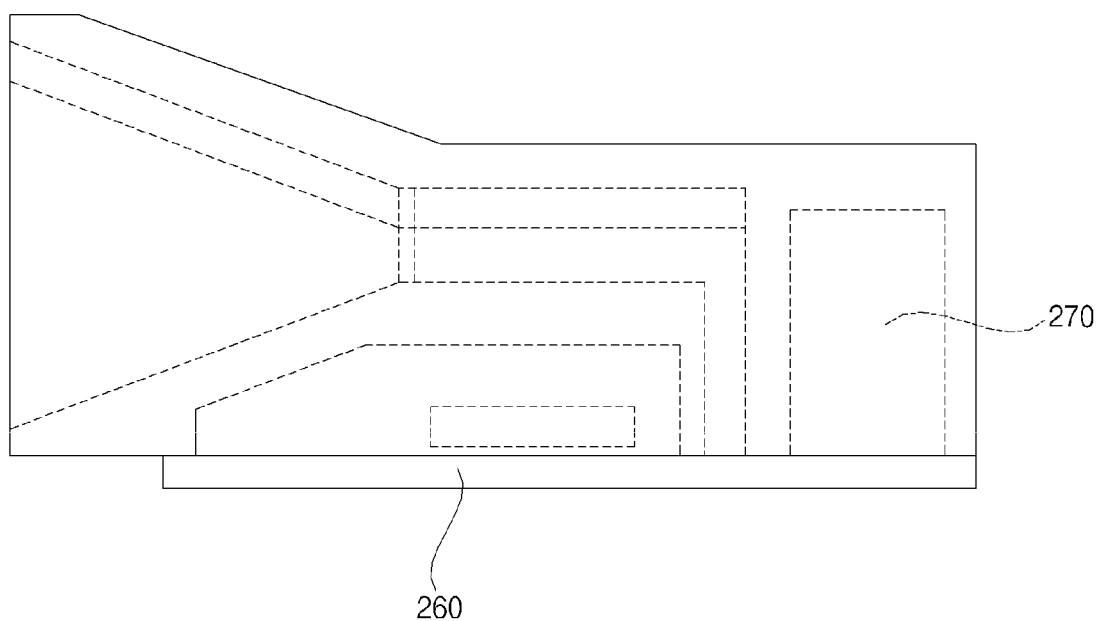

FIG. 9 is a cross-sectional view taken along line B-B in FIG. 6A.

Referring to the drawings, the antenna module 210 may have a body 220. The body 220 may be surrounded by multiple surfaces. The body 220 may be defined by a top surface 221, a bottom surface 222, a front surface 223, a back surface, a first side surface 224, and a second side surface.

When the antenna module 210 is horizontally disposed in an internal space defined by the housing 113 and the outer lens 112, the body 220 may be described as follows. The top surface 221 may be defined as a surface facing the sky. The bottom surface 222 may be defined as a surface facing the ground. The front surface 223 may be defined as a surface facing a direction of transmitting electromagnetic waves. The back surface may be defined as a surface opposing the front surface 223. The first side surface 224 and the second side surface may be defined as surfaces physically connecting the top surface 221, the bottom surface 222, the front surface 223, and the back surface.

At least one opening may be formed in the antenna module 210 to irradiate electromagnetic waves. At least one opening may be formed in the body 220 of the antenna module 210 to irradiate electromagnetic waves. As illustrated in FIG. 6A, at least one opening 231, 232, 233, 234, 235, 236, or 237 may be formed in the front surface 223 of the antenna module 210 to irradiate electromagnetic waves.

A plurality of slots extending in an up and down direction is formed on the antenna module 210. A plurality of slots extending in the up and down direction is formed on the body 220 of the antenna module 210. As illustrated in FIG. 6A, a plurality of slots 231, 232, 233, 234, 235, 236, or 237 extending in the up and down direction is formed on the front surface 223 of the antenna module 210.

In some embodiments, a plurality of slots extending in a left and right direction may be formed in the antenna module 210. A plurality of slots extending in the left and right direction may be formed in the body 220 of the antenna module 210.

In the following description, an azimuth angle direction may be understood as referring to a horizontal direction (e.g., the left and right direction) of a radar device 200 for a vehicle, and an elevation angle direction may be understood as referring to a vertical direction (e.g., the up and down direction) of the radar device 200.

As illustrated in FIG. 7, the body 220 of the antenna module 210 may include at least one horn antenna 241, 242, 243, 244, 245, 246, or 247 there inside.

An aperture may be formed in at least one horn antenna 241, 242, 243, 244, 245, 246, or 247 to irradiate electromagnetic waves to an external space. Openings may be formed in the body 220 of the antenna module 210 to expose apertures of the horn antennas 241, 242, 243, 244, 245, 246, and 247, respectively. The openings formed in the body 220 of the antenna module 210 are formed at positions corresponding to the respective apertures of the horn antennas 241, 242, 243, 244, 245, 246, and 247, such that the body 220 of the antenna module 210 does not block the respective apertures of the horn antennas 241, 242, 243, 244, 245, 246, and 247.

At least one horn antenna 241, 242, 243, 244, 245, 246, or 247 may include a receiver antennas 241, 242, 243, or 244, or a transmitter antennas 245, 246, or 247.

The plurality of transmitter antennas 245, 246, and 247 may constitute an array antenna. Although FIG. 7 illustrates that three transmitter antennas are included, the number of antennas is not limited.

An interval of the plurality of receiver antennas 241, 242, 243, and 244 may be determined based on a wavelength of a center frequency of a transmitted signal.

Meanwhile, a center frequency of a transmitted signal may be a center frequency of a frequency range used for the radar device for a vehicle. For example, the center frequency of the transmitted signal may be one of 24 GHz, 76.5 GHz, and 81 GHz.

The plurality of transmitter antenna 245, 246, and 247 may be determined based on a wavelength of a center frequency of a transmitted signal to have an interval in an azimuth angle direction. For example, an interval for the plurality of transmitter antenna 245, 246, and 247 in the azimuth angle direction may be determined based on a wavelength of a center frequency of a transmitted signal. For example, an interval for the plurality of transmitter antennas 245, 246, and 247 may have a length, which is 2 times a wavelength of a center frequency of a transmitted signal, in the azimuth angle direction.

Figure 8:
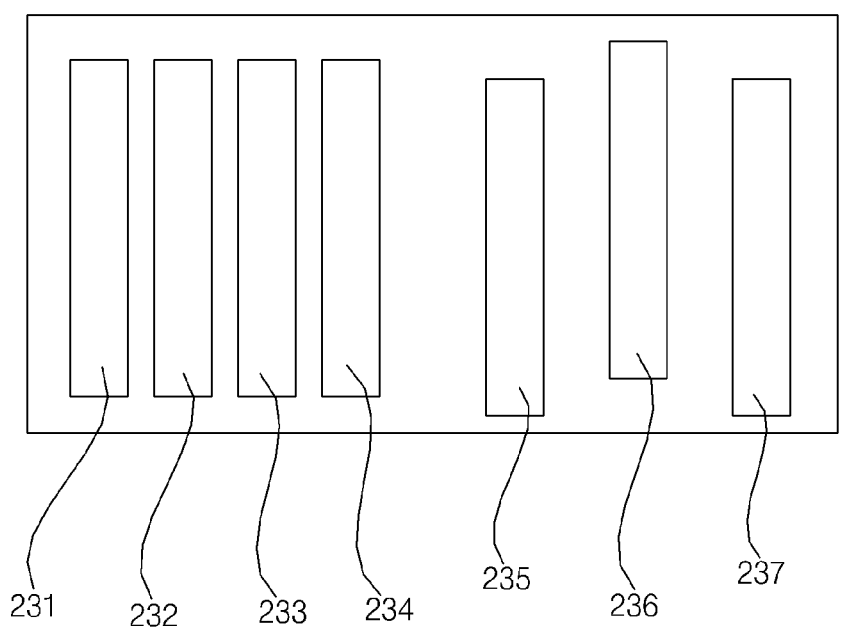
Figure 8:
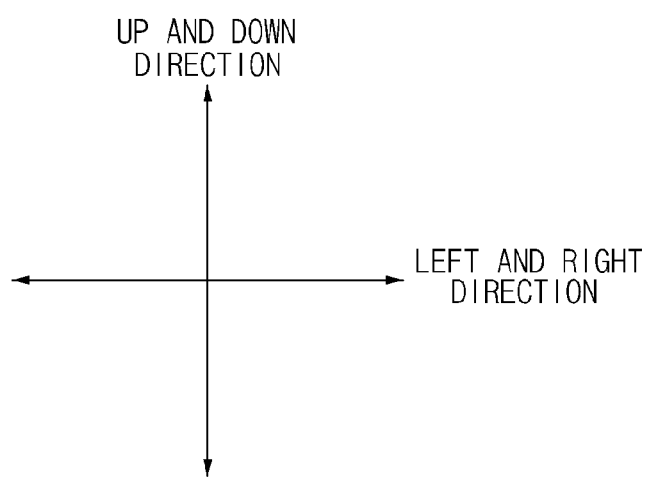

As illustrated in FIG. 8, the plurality of slots 235, 236, and 237 respectively corresponding to the plurality of transmitter antennas 245, 246, and 247 may be determined based on a wavelength of a center frequency of a transmitted signal to have an interval in an azimuth angle direction. For example, an interval for the plurality of slots 235, 236, and 237 may have a length, which is 2 times a wavelength of a center frequency of a transmitted signal, in the azimuth angle direction.

The plurality of transmitter antennas 245, 246, and 247 may be determined based on a wavelength of a center frequency of a transmitted signal to have an interval in an elevation angle direction. For example, an interval for the plurality of transmitter antennas 245, 246, and 247 in the elevation angle direction may be determined based on a wavelength of a center frequency of a transmitted signal. For example, at least some of the plurality of transmitter antennas 245, 246, and 247 may be disposed at an interval of a length, which is 0.5 to 3 times a wavelength of a center frequency of a transmitted signal, in the elevation angle direction (or a vertical direction).

As illustrated in FIG. 8, the plurality of slots 235, 236, 237 respectively corresponding to the plurality of transmitter antennas 245, 246, and 247 may be determined based on a wavelength of a center frequency of a transmitted signal to have an interval in an elevation angle direction. For example, at least some of the plurality of slots 235, 236, and 237 may be disposed at an interval of a length, which is 0.5 to 3 times a wavelength of a center frequency of a transmitted signal, in the elevation angle direction (or a vertical direction). In this case, at least one slot 236 in the plurality of slots 231, 232, 233, 234, 235, 236, and 237 may be formed at a different position in the up and down direction, as compared with other slots.

The plurality of receiver antennas 241, 242, 243, and 244 may constitute an array antenna. Although FIG. 7 illustrates that four receiver antennas are included, the number of antennas is not limited.

The plurality of receiver antennas 241, 242, 243, and 244 may be determined based on a wavelength of a center frequency of a transmitted signal to have an interval in an azimuth angle direction. For example, an interval for the plurality of receiver antennas 241, 242, 243, and 244 in the azimuth direction may be determined based on a wavelength of a center frequency of a transmitted signal. For example, an interval for the plurality of receiver antennas 241, 242, 243, and 244 may have a length 0.4 to 0.6 times a wavelength of a center frequency of a transmitted signal. For example, an interval for the plurality of receiver antenna 241, 242, 243, and 244 in the elevation angle direction may be determined based on a wavelength of a center frequency of a transmitted signal.

The plurality of receiver antennas may include a first receiver antenna 241, a second receiver antenna 242, a third receiver antenna 243, and a fourth receiver antenna 244. The first receiver antenna 241 may receive received signals based on a plurality of transmitted signals which are respectively transmitted from the plurality of transmitter antennas 245, 246, and 247. For example, the first receiver antenna 241 may receive a first received signal based on a first transmitted signal transmitted from the first transmitter antenna 245, a second received signal based on a second transmitted signal transmitted from the second transmitter antenna 246, and a third received signal based on a third transmitted signal transmitted from the third transmitter antenna 247.

The second receiver antenna 242 may receive received signals based on a plurality of transmitted signals which are respectively transmitted from the plurality of transmitter antennas 245, 246, and 247. For example, the second receiver antenna 242 may receive a first received signal based on a first transmitted signal transmitted from the first transmitter antenna 245, a second received signal based on a second transmitted signal transmitted from the second transmitter antenna 246, and a third received signal based on a third transmitted signal transmitted from the third transmitter antenna 247. The second receiver antenna 242 may be spaced apart from the first receiver antenna 241 with a distance which is 0.5 times a wavelength of a center frequency of a transmitted signal in the azimuth angle direction.

The third receiver antenna 243 may receive received signals being based on a plurality of transmitted signals which are respectively transmitted from the plurality of transmitter antennas 245, 246, and 247. For example, the third receiver antenna 243 may receive a first received signal based on a first transmitted signal transmitted from the first transmitter antenna 245, a second received signal based on a second transmitted signal transmitted from the second transmitter antenna 246, and a third received signal based on a third transmitted signal transmitted from the third transmitter antenna 247. The third receiver antenna 243 may be spaced apart from the second receiver antenna 242 in the azimuth angle direction with a distance which is 0.5 times a wavelength of a center frequency of a transmitted signal away. The third receiver antenna 243 may be spaced apart from the first receiver antenna 241 at a distance one time the wavelength of the center frequency of the transmitted signal in the azimuth angle direction.

The fourth receiver antenna 244 may receive received signals, which are based on a plurality of transmitted signals respectively transmitted from the plurality of transmitter antennas 245, 246, and 247. For example, the fourth receiver antenna 244 may receive a first received signal based on a first transmitted signal transmitted from a first transmitter antenna 245, a second received signal based on a second transmitted signal transmitted from a second transmitter antenna 246, and a third received signal based on a third transmitted signal transmitted from the third transmitter antenna 247. The fourth receiver antenna 244 may be spaced apart from the third receiver antenna 243 with a distance 0.5 times a wavelength of a center frequency of a transmitted signal in the azimuth angle direction. The fourth receiver antenna 244 may be spaced apart from the first receiver antenna 241 with a distance 1.5 times the wavelength of the center frequency of the transmitted signal in the azimuth angle direction.

FIGS. 10A to 16B are diagrams illustrating an antenna module and a bezel according to an embodiment of the present invention.

FIGS. 10A to 15B illustrates an example in which the body 220 of the antenna module 210 is physically separated from the bezel 114.

Figure 10A:
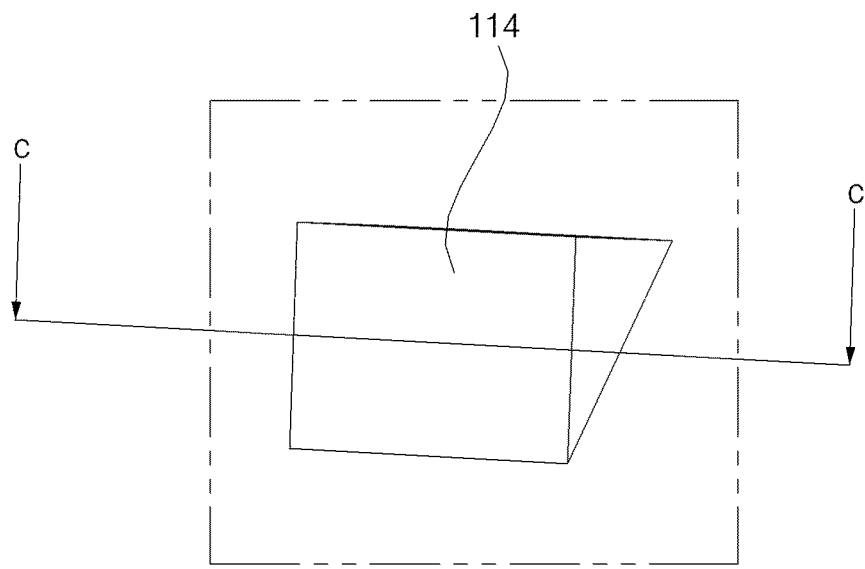
FIGS. 10A to 16B are diagrams illustrating an antenna module and a bezel according to an embodiment of the present invention.
Figure 10B:
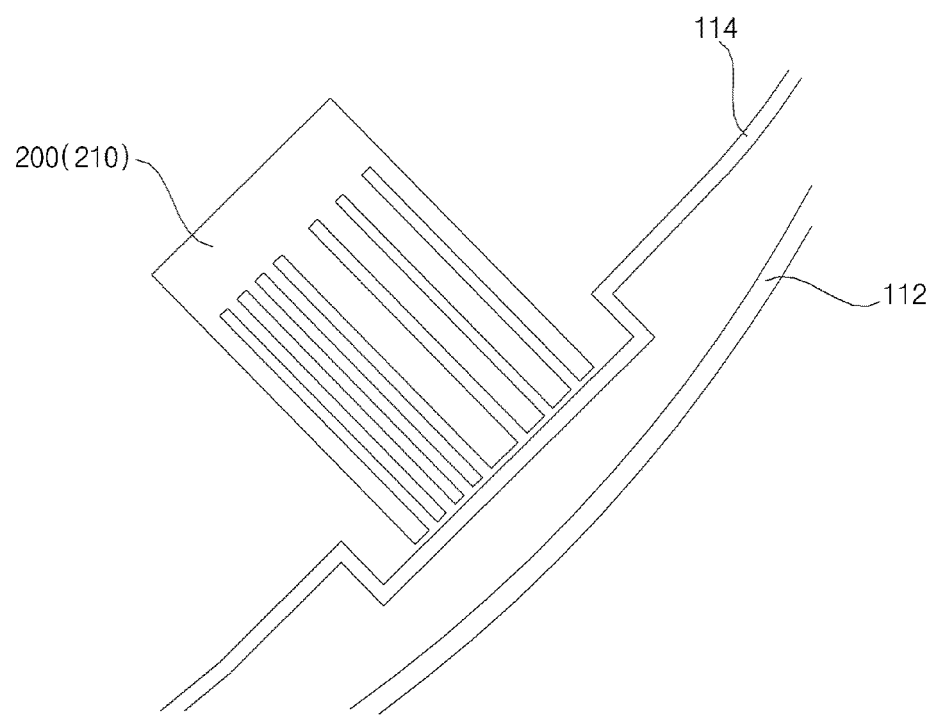

FIGS. 10A and 10B illustrate an example in which the bezel 114 covers the antenna module 210. FIG. 10A illustrates an example of a part of an exterior appearance of the lamp 100, and FIG. 10B is a cross-sectional view taken along line C-C in FIG. 10A.

As illustrated in FIG. 10B, when the bezel 114 is placed between the antenna module 210 and the outer lens 112, an antenna include in the antenna module 210 may have a low transmission and reception rate. Accordingly, as illustrated in FIGS. 10A to 15B, it is necessary to apply a special shape to the bezel 114.

Figure 11A:
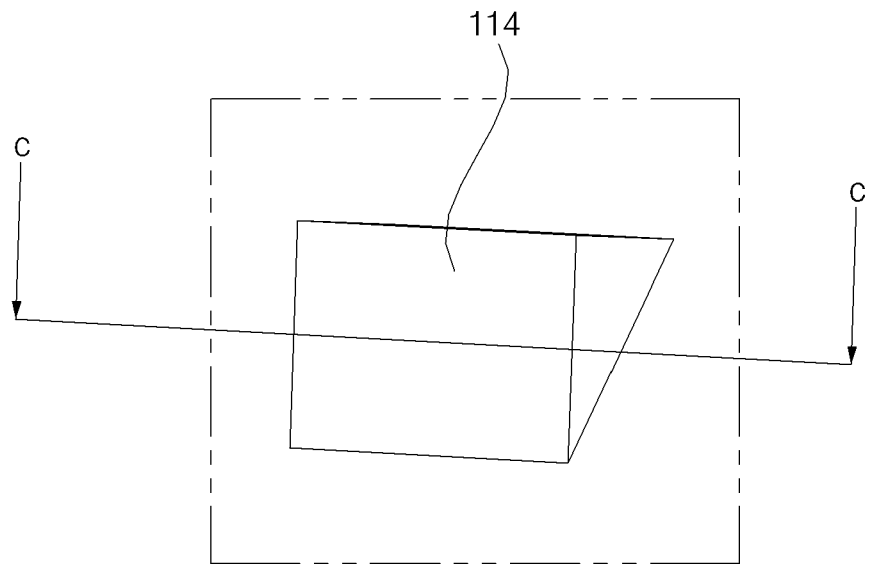
Figure 11B:
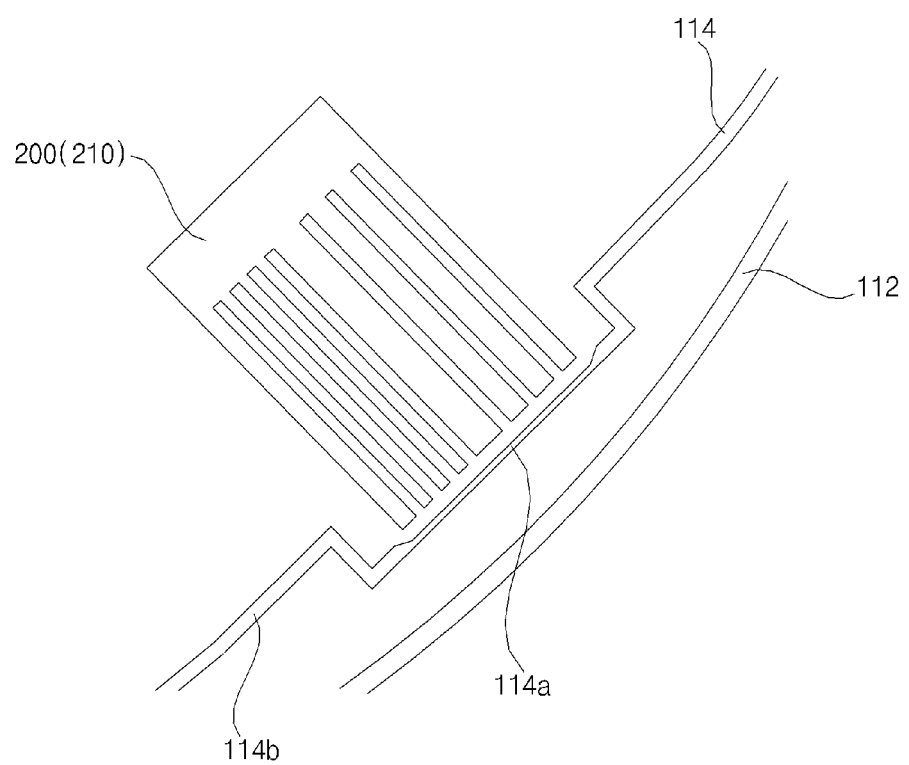

FIG. 11A illustrates a part of the exterior appearance of the lamp 100, and FIG. 11B is a cross-sectional view taken along line C-C in FIG. 11A. As illustrated in FIGS. 11A and 11B, a region 114a of the bezel 114, which corresponds to the antenna module 210, may be formed thinner than another region 114b. The region 114a of the bezel 114, which is placed between the antenna module 210 and the outer lens 112, may be formed with a less thickness than another region 114b.

Figure 12A:
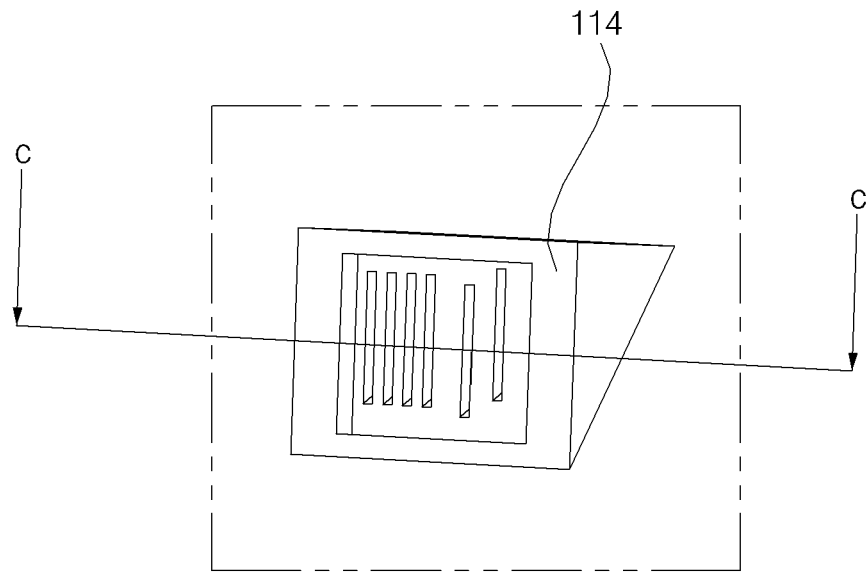
Figure 12B:
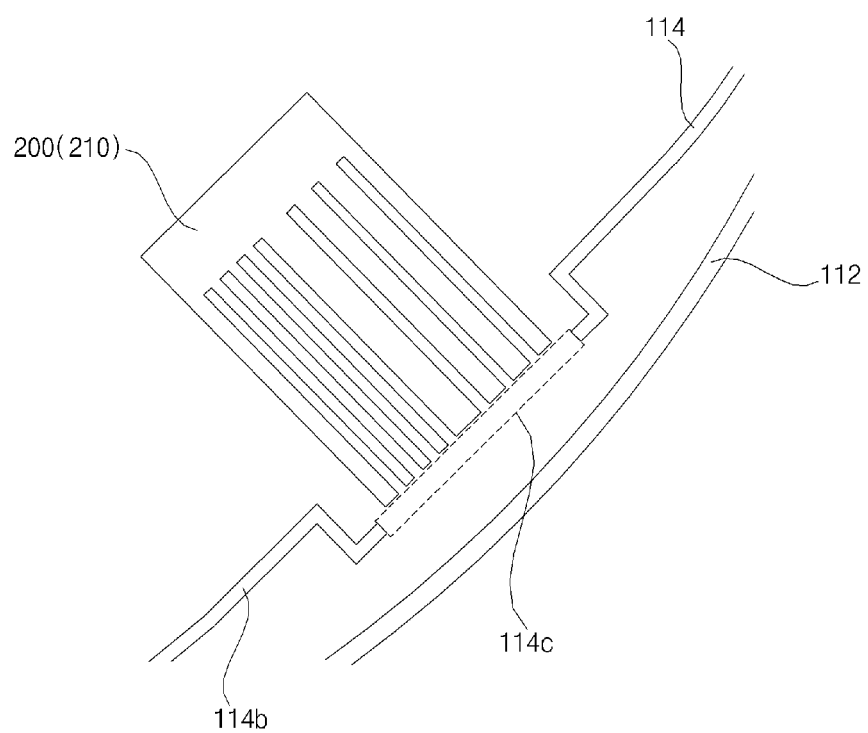

FIG. 12A illustrates an example of a part of an exterior appearance of the lamp 100, and FIG. 12B is a cross-sectional view taken along line C-C in FIG. 12A. As illustrated in FIGS. 12A and 12B, a partial region of the bezel 114 may be omitted. The bezel 114 may include an opening 114c. The opening 114c of the bezel 114 may be formed between the antenna module 210 and the outer lens 113.

Figure 13A:
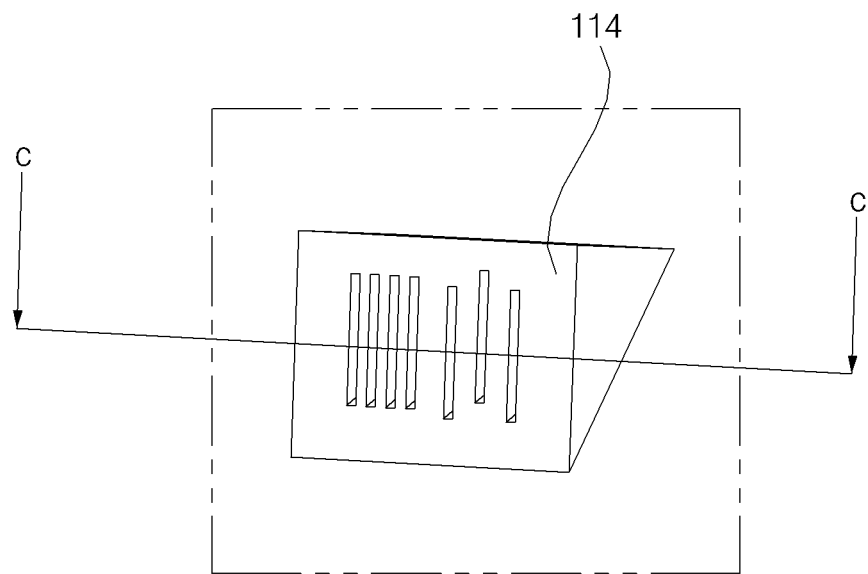
Figure 13B:
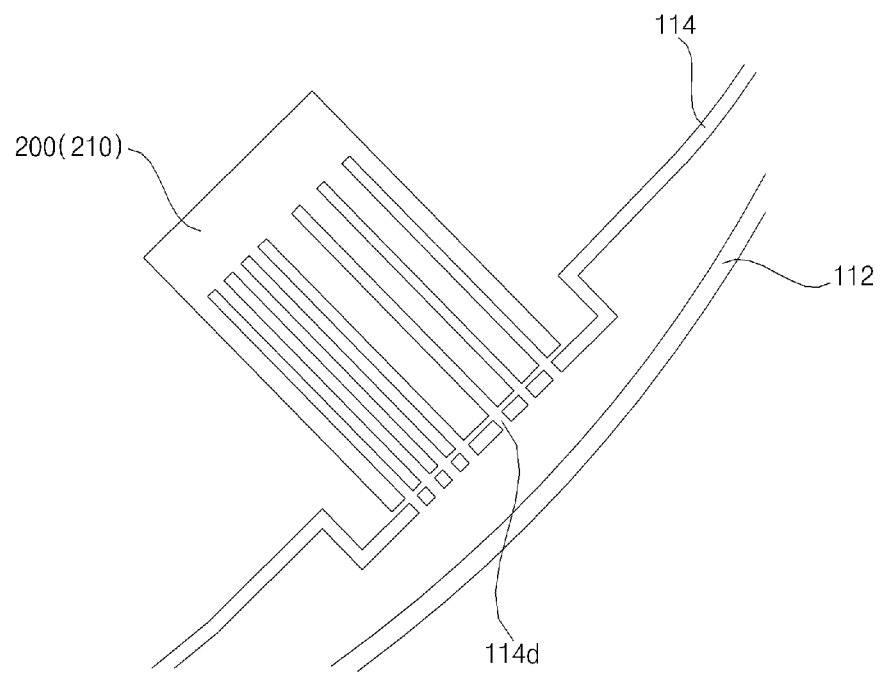

FIG. 13A illustrates an example of a part of an exterior appearance of the lamp 100, and FIG. 13B is a cross-sectional view taken along line C-C in FIG. 13A. As illustrated in FIGS. 13A and 13B, at least one slot 114d may be formed in the bezel 114 to corresponding to an opening formed in the body 220 of the antenna module 210. At least one slot 114d may be formed as many as the number of antennas. At least one slot 114d may take the shape of the opening formed in the body 220 of the antenna module 210.

Figure 14A:
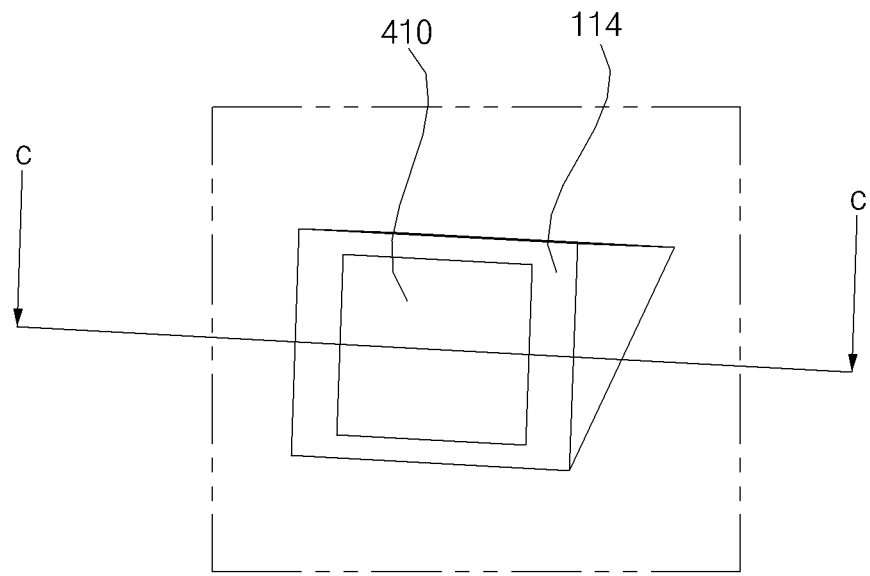
Figure 14B:
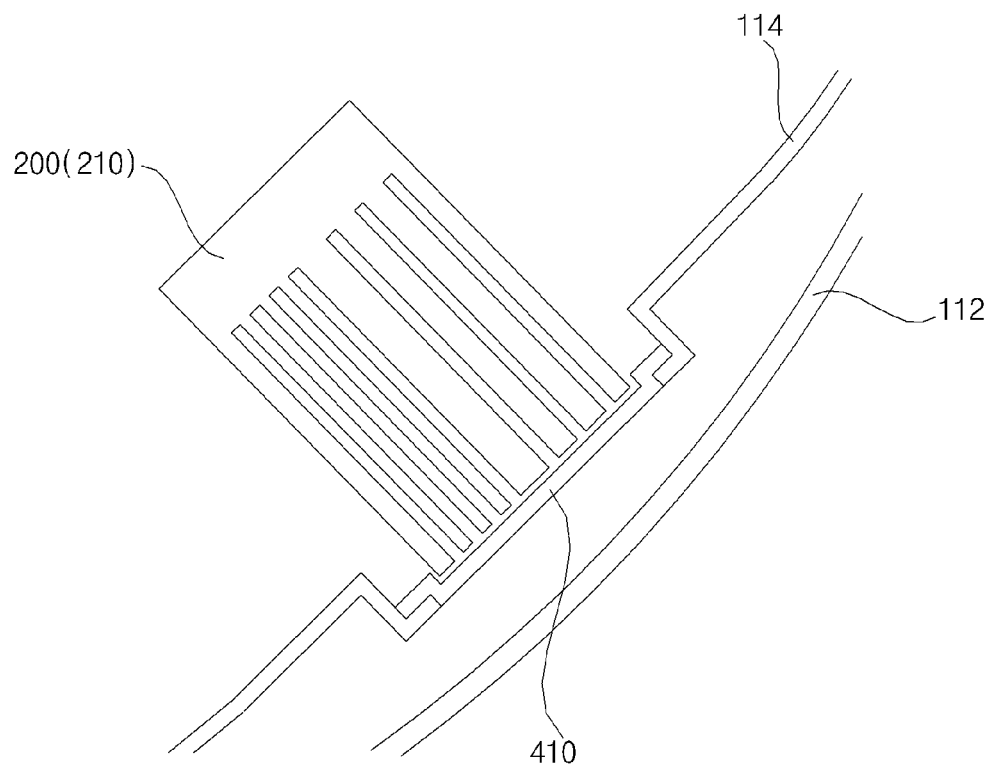

FIG. 14A illustrates an example of a part of an exterior appearance of the lamp 100, and FIG. 14B is a cross-sectional view taken along line C-C in FIG. 14A. As illustrated in FIGS. 14A and 14B, the lamp 100 may further include a cover 410. The cover 410 may be coupled to the bezel 114. The cover 410 may cover a region corresponding to the opening formed in the body 220 of the antenna module 210. The cover 410 may be disposed between the antenna module 210 and the outer lens 112.

Figure 15A:
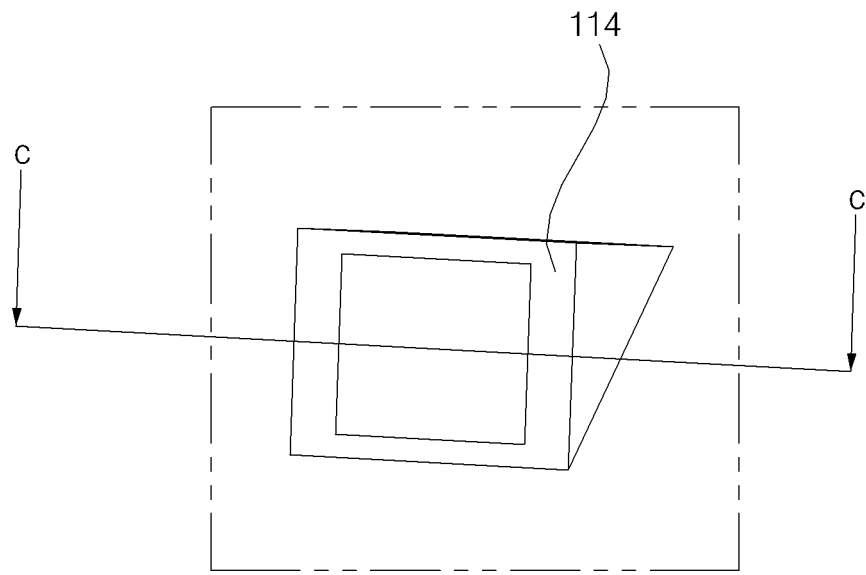
Figure 15B:
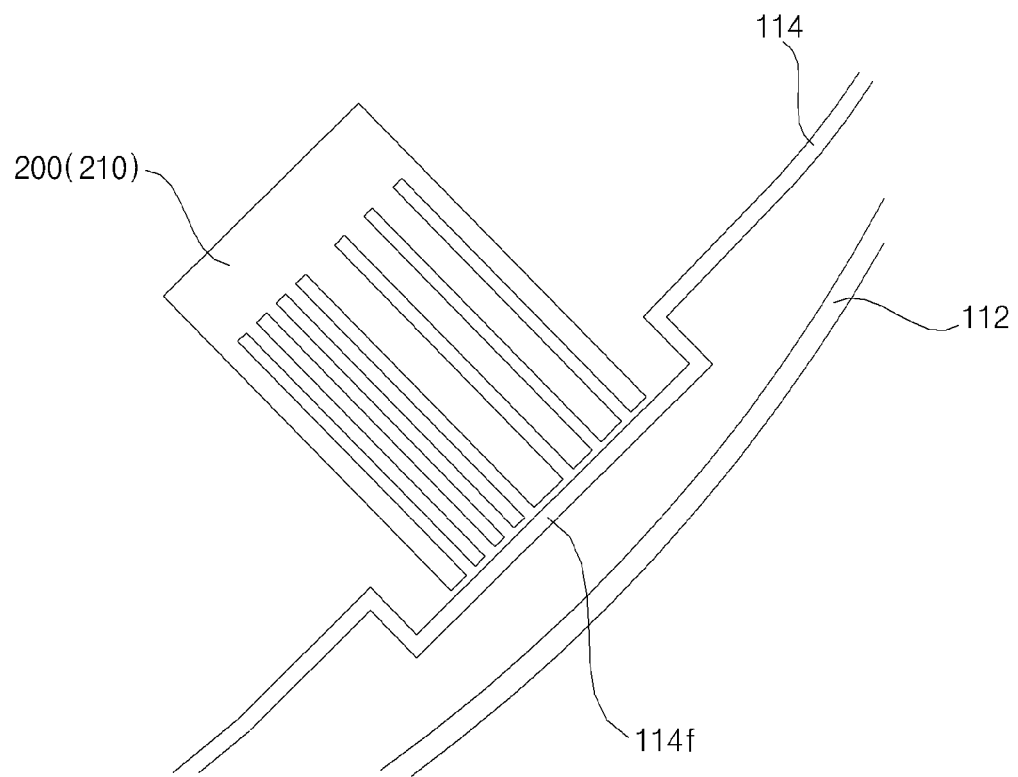

FIG. 15A illustrates an example of a part of an exterior appearance of the lamp 100, and FIG. 15B is a cross-sectional view taken along line C-C in FIG. 15A. At least part of the bezel 114 may be surface-treated with a reflective material. For example, at least part of the bezel 114 may be laminated to aluminum. In this case, a region 114f corresponding to the opening formed in the body 220 of the antenna module 210 may be excluded from a surface treatment. After the region 114f of the bezel 114, which corresponds to the antenna module 210, is masked, the surface treatment of the bezel 114 may be performed.

Figure 16A:
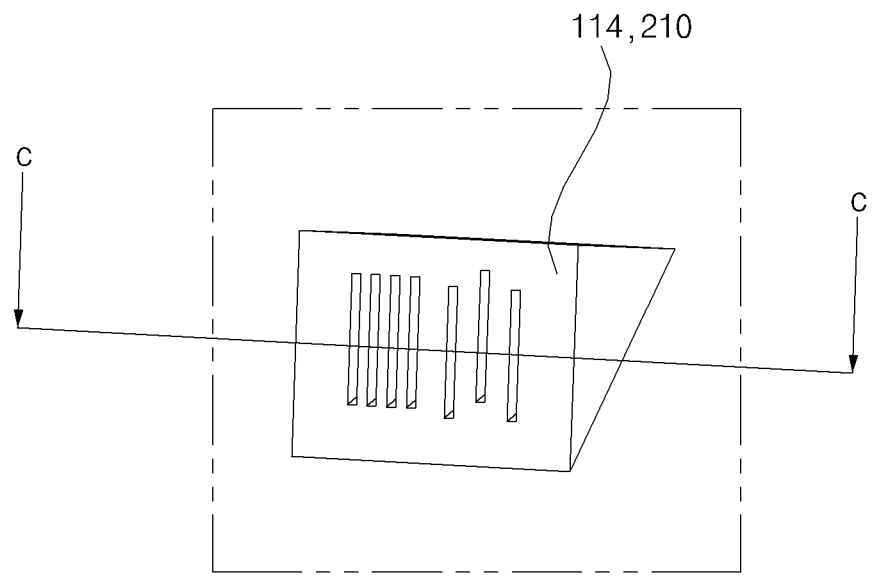
Figure 16B:
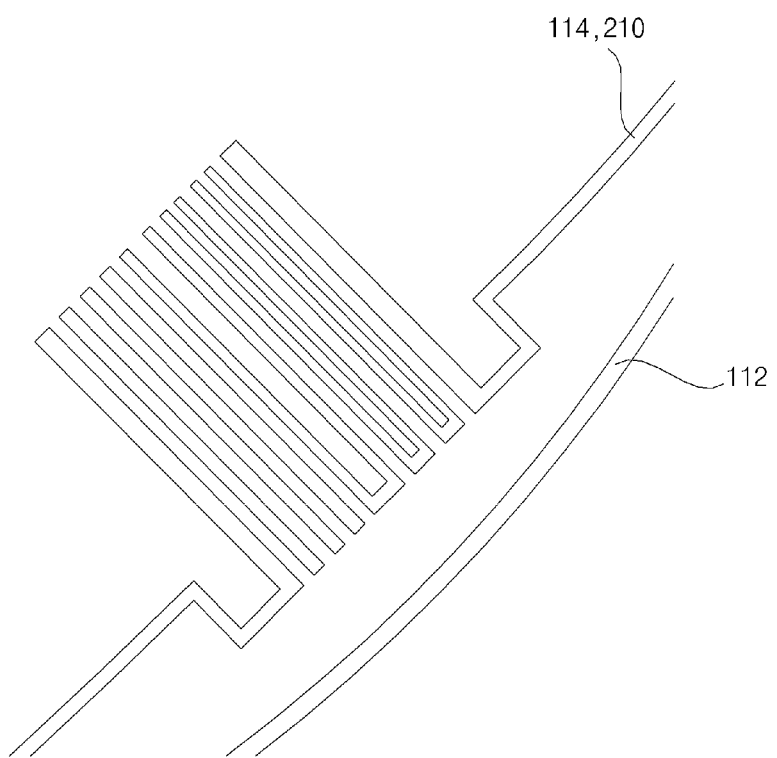

FIGS. 16A and 16B are diagrams illustrating an example in which the body 220 of the antenna module 210 is integrally formed with the bezel 114. FIG. 16A illustrates an example of a part of an exterior appearance of the lamp 100, and FIG. 16B is a cross-sectional view taken along line C-C in FIG. 16A.

The lamp may further include the bezel 114. The body 220 of the antenna module 210 may be integrally formed with the bezel 114. At least one horn antenna may be disposed in the body 220.

At least one opening may be formed in the bezel 114. When the bezel 114 is integrally formed with the body 220 of the antenna module 210, a slot may be formed in a region of the bezel 114, which corresponds to an aperture of a horn antenna.

Figure 17:
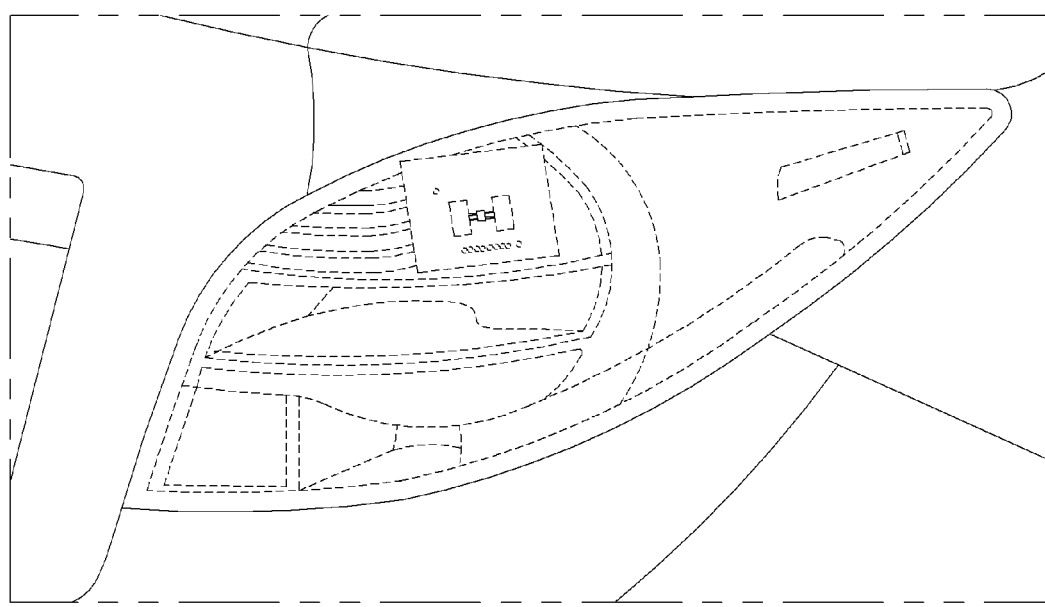
FIGS. 17 and 18 are diagrams illustrating a lamp according to an embodiment of the present invention.
Figure 18:
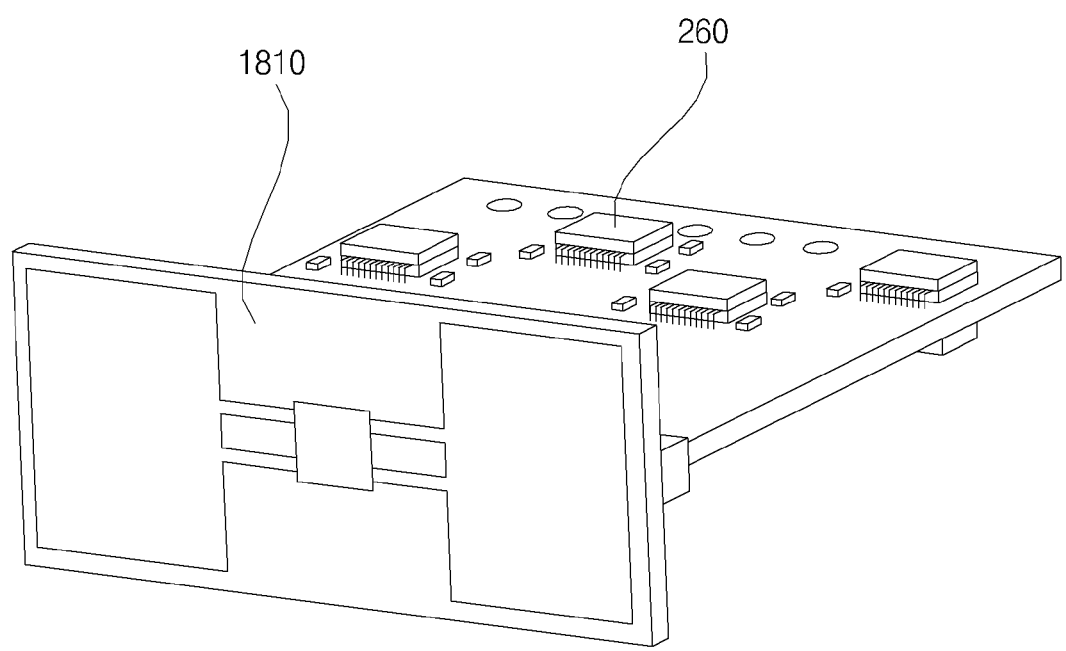

FIGS. 17 and 18 are diagrams illustrating a lamp according to an embodiment of the present invention.

Referring to the drawings, the lamp 100 may include at least one light source, an outer lens, a housing, a microstrip antenna 1810, and a PCB 260. The light source, the outer lens, the housing, and the PCB 260 are the same as described above with reference to FIGS. 1 to 16B.

The microstrip antenna 1810 may be vertically disposed in a space formed by the outer lens and the housing. The microstrip antenna 1810 may transmit and receive electromagnetic waves. The micro strip antenna 1810 may be electrically connected to the PCB 260. The microstrip antenna 1810 may be disposed vertical to the PCB 260. Here, that the term "vertical" is understood as referring not to the mathematical concept, but to the physical concept of having a value approximate to 90 degrees.

The present invention as described above may be implemented as code that can be written on a computer-readable medium in which a program is recorded and thus read by a computer. The computer-readable medium includes all kinds of recording devices in which data is stored in a computer-readable manner. Examples of the computer-readable recording medium may include a hard disk drive (HDD), a solid state disk (SSD), a silicon disk drive (SDD), a read only memory (ROM), a random access memory (RAM), a compact disk read only memory (CD-ROM), a magnetic tape, a floppy disc, and an optical data storage device. In addition, the computer-readable medium may be implemented as a carrier wave (e.g., data transmission over the Internet). In addition, the computer may include a processor or a controller. Thus, the above detailed description should not be construed as being limited to the embodiments set forth herein in all terms, but should be considered by way of example. The scope of the present invention should be determined by the reasonable interpretation of the accompanying claims and all changes in the equivalent range of the present invention are intended to be included in the scope of the present invention.

What is claimed is:

1. A lamp for a vehicle, comprising:
at least one light source;
an outer lens for covering the at least one light source;
a housing coupled to the outer lens to form a space;
an antenna module disposed in the space and comprising
at least one horn antenna for transmitting and receiving electromagnetic waves; and
a Printed Circuit Board (PCB) disposed in the space, and electrically connected with the at least one horn antenna,
wherein the PCB is horizontally disposed,
wherein a top surface of the PCB is electrically connected with the at least one horn antenna, and
wherein a bottom surface of the PCB is electrically connected with a Monolithic Microwave Integrated Circuit (MIMIC) that is included in a radar device.

2. The lamp of claim 1, wherein the at least one horn antenna is disposed in a region to which light generated by the at least one light source is not emitted.

3. The lamp of claim 1, wherein the at least one horn antenna is covered by a relatively flat region of the outer lens.

4. The lamp of claim 1, further comprising a bezel, wherein the antenna module is integrally formed with the bezel.

5. The lamp of claim 1, wherein the antenna module is horizontally disposed.

6. The lamp of claim 5, wherein the at least one horn antenna is a H-plane sectoral horn array antenna.

7. The lamp of claim 5, wherein the at least one horn antenna is an E-plane sectoral horn array antenna.

8. The lamp of claim 1, wherein at least one opening is formed in the antenna module to irradiate electromagnetic waves.

9. The lamp of claim 8, wherein a plurality of slots extending in an up and down direction is formed in the antenna module.

10. The lamp of claim 9, wherein at least one of the plurality of slots is formed at a different position in the up and down direction, as compared with other slots.

11. The lamp of claim 8, wherein a plurality of slots extending in a left and right direction is formed in the antenna module.

12. The lamp of claim 8, further comprising a bezel having at least one slot formed therein to correspond to the opening.

13. The lamp of claim 8, further comprising a bezel, at least part of which is surface-treated with a reflective material, and a region of which corresponding to the opening is excluded from a surface treatment.

14. The lamp of claim 13, further comprising a cover coupled to the bezel, and covering the region corresponding to the opening.

15. The lamp of claim 4, wherein at least one opening is formed in the bezel.

* * * * *